United States Patent [19]

Schmidt

[11] 4,026,150

[45] May 31, 1977

[54] MASS FLOW METER

[75] Inventor: Thomas R. Schmidt, Houston, Tex.

[73] Assignee: Shell Oil Company, Houston, Tex.

[22] Filed: Feb. 17, 1976

[21] Appl. No.: 658,934

[52] U.S. Cl. .......................... 73/194 VS; 73/194 M
[51] Int. Cl.² .......................................... G01F 1/32
[58] Field of Search ...... 73/194 B, 194 VS, 194 M, 73/231 R, 231 M

[56] References Cited

UNITED STATES PATENTS

| | | | |
|---|---|---|---|
| 2,813,424 | 11/1957 | Leipmann et al. | 73/194 |
| 3,164,990 | 1/1965 | Henness et al. | 73/194 |
| 3,208,269 | 9/1965 | Eccles et al. | 73/194 |
| 3,224,273 | 12/1965 | Sipin | 73/231 |
| 3,635,082 | 1/1972 | Prellwitz et al. | 73/194 |
| 3,635,084 | 1/1972 | Lamphere | 73/194 |
| 3,719,073 | 3/1972 | Mahon | 73/194 |
| 3,772,915 | 11/1973 | Stamler | 73/194 |
| 3,776,033 | 12/1973 | Herzl | 73/194 |
| 3,927,566 | 12/1975 | Zanker | 73/194 |

*Primary Examiner*—Herbert Goldstein

[57] ABSTRACT

A method and apparatus for determining the mass flow of a fluid using dielectric constant measurements to determine density and converting the velocity of flow to a related frequency. The measurement of both the dielectric constant and frequency are made using a single capacitor.

5 Claims, 3 Drawing Figures

MASS FLOW METER

BACKGROUND OF THE INVENTION

The present invention relates to mass flow measurements and more particularly to an apparatus and method for determining mass flow from a single measurement signal. In most mass flow measurements it is necessary to produce a signal related to the rate of fluid flow and a separate signal related to the density of the fluid and then combine the signals to produce a mass flow signal. The difficulty in all of these mass flow measuring systems is the ability to accurately measure the density of the fluid. Also all of these systems require the use of two separate means for producing signals, the first producing a signal related to the fluid flow and the second producing a signal relating to the fluid's density. This is an additional complication which increases the chances of malfunctioning or inoperativeness of the systems.

In recent years the Von Karman vortex shedding phenomena has been used to develop instruments for measuring fluid flow rates. The vortex shedding flow meter comprises a bluff body which projects into the fluid at substantially right angles to the fluid flow. As the fluid flows past the bluff body and separates from the bluff body on the downstream side, a vortex or turbulence is created. The frequency of oscillation of the vortex at right angles to the flow is directly proportional to the flow velocity and inversely proportional to the diameter of the object. The bluff body can take the shape of a cylinder or a triangular-shaped element with the base of the triangle facing the direction of flow. The advantage of a vortex shedding flow meter results from the fact that it is independent of specific gravity, viscosity, pressure or temperature of the fluid. Thus, the vortex generating object, if correctly shaped and placed in a pipeline or conduit, forms a primary flow measuring element that will generate pulse signals over wide flow ranges at a frequency proportional to the flow.

The fluid flow can be determined from the equation $v = (fD)/s$, wherein $v$ is the velocity of flow, $f$ is the vortex frequency, $D$ is the diameter of the bluff body and $s$ is the Strouhal number which remains constant over a very wide range of Reynolds numbers.

The weakness in the present vortex shedding meters is the method used for sensing the frequency of the vortex shedding. The primary method used in the state-of-the art relies on heated thermistors placed on opposite sides of the bluff body so that the thermistors will be unevenly heated as the vortex tends to oscillate back and forth in the fluid stream. While thermistors successfully detect the frequency of the vortex shedding, they are delicate devices and become damaged in most fluid systems. Thus, the advantages of the vortex shedding flow meters are not fully realized due to the malfunctioning of the sensing systems.

BRIEF DESCRIPTION OF THE INVENTION

The present invention solves the above problems of the vortex shedding flow meters by utilizing a capacitor to detect the variation in the frequency of the vortex. The plates of the capacitor should be positioned so that they are influenced by the oscillation of the vortex. This can be accomplished by placing one of the plates of the capacitor in the vortex stream and the other plate outside the vortex stream. A simplified version can be made by utilizing the bluff body as one plate of the capacitor and placing the second plate outside the vortex stream. The ripple current induced on the steady state background of the capacitor signal will be the frequency of the vortex and can be used in the formula given above for determining the velocity of the flow.

An additional advantage obtained by using a capacitor to sense the frequency of the vortex is that it provides a measurement of the dielectric constant of the fluid. The dielectric constant and density are related by the well known Clausius-Massotti equation:

$$P = K \frac{(\epsilon - 1)}{(\epsilon + 2)},$$

where $P$ is the density, $K$ is a constant, and $\epsilon$ is the relative dielectric constant. The steady state of the capacitor is of course related to the dielectric constant and can be used for determining density. Thus, having both density and velocity of flow, one can determine the mass flow of the fluid.

The concept of using a capacitor to produce both a signal related to velocity of flow and a signal related to the dielectric constant so that one may produce a mass flow signal that can be used with any type of fluid measuring means that produces an oscillating signal whose frequency is related to the flow velocity. For example, one plate of the capacitor could be disposed so that the blades of a turbine meter form the other plate or a portion of the plate of the capacitor. Thus, the passage of the turbine blades will produce an oscillating current in the capacitor signal while the steady state signals will be related to the dielectric constant of the fluid. These two signals can then be used in the same manner as described above with relation to the vortex shedding flow meter to produce a mass flow signal.

BRIEF DESCRIPTION OF THE DRAWINGS

The present invention will be more easily understood from the following detailed description of the preferred embodiment when taken with the attached drawings, in which.

PREFERRED EMBODIMENT

Figure 1:
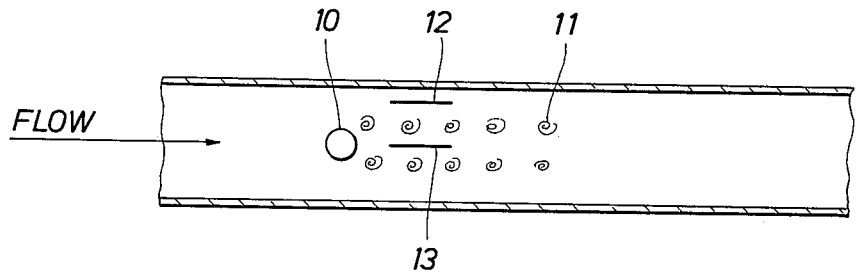
FIG. 1 shows an embodiment of the invention using a vortex shedding flow meter.

Referring now to FIG. 1, there is shown a bluff body disposed in the pipeline or conduit conveying a fluid flowing in the direction indicated in FIG. 1. The bluff body is shown as a cylindrical body 10 which is positioned at right angles to the fluid flow. The fluid flowing past the bluff body separates at the downstream side of the bluff body and produces a series of vortexes 11 as the fluid sheds from the back of the bluff body. The frequency of the oscillation of the vortexes from side to side in the conduit can be determined by a capacitor comprising the plates 12 and 13. As shown, the plate 13 is positioned inside the vortex stream while the plate 12 is placed outside the vortex stream. Thus, the oscillation of the stream back and forth will produce a ripple current flow in the capacitor while the dielectric constant of the fluid will produce a steady state current flow. These measurements can be combined as shown in FIG. 2 and described below to produce a mass flow signal.

Figure 2:
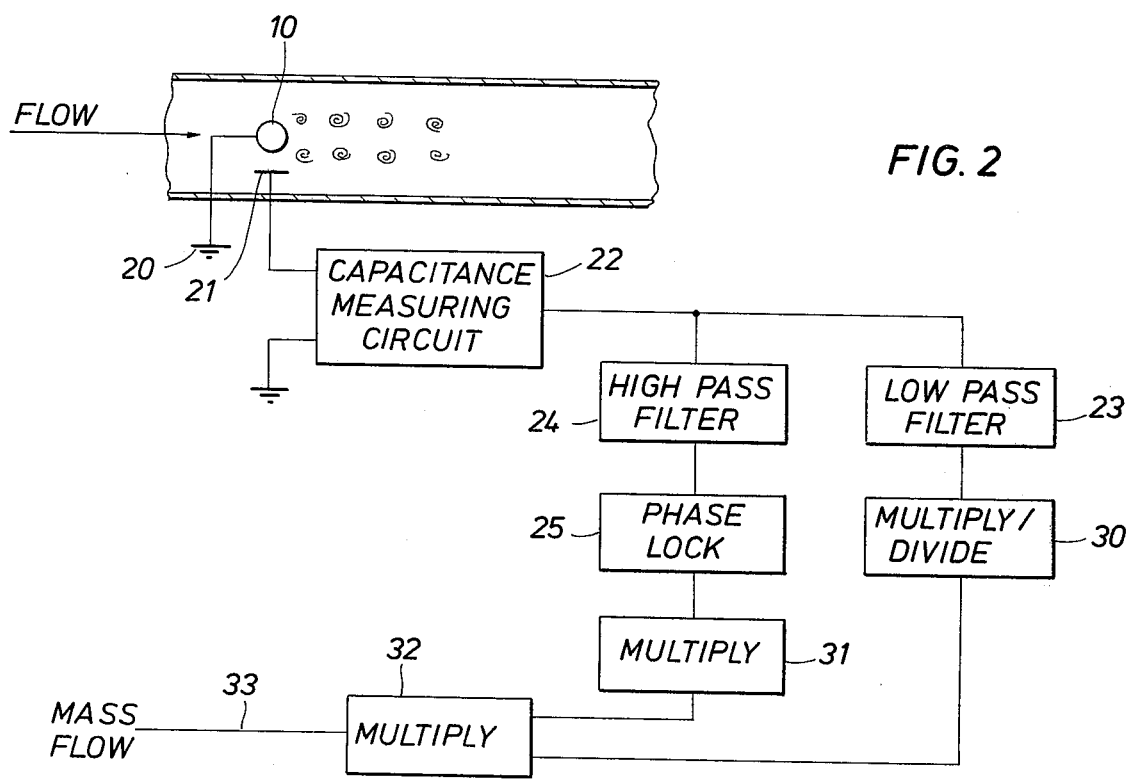
FIG. 2 shows a second embodiment of the invention using a vortex shedding flow meter.

Referring now to FIG. 2, there is shown the same bluff body and flow set-up as shown in FIG. 1 but with a second form of capacitor. In the system shown in FIG. 2 the bluff body is used as one plate of the capacitor while the second plate 21 is placed to the side of the bluff body. The voltage signal from the capacitor is supplied to a capacitance measuring circuit 22 whose output is supplied to filters 23 and 24. The capacitance measuring circuit may be any of several well known circuits. For example, an alternating current bridge circuit and detector can be used to measure both the average and fluctuating capacitance. An alternate arrangement would be to use the capacitor as one element in an oscillator circuit. The oscillator output can be counted to determine the average capacity and a frequency discriminator used to determine the fluctuating component of capacity. The filter 23 comprises a low-pass filter which removes substantially all frequencies while passing only the steady state signal from the capacitor. While the dielectric constant may vary over a narrow range and produce a slow drift in the steady state signal, the frequency of these changes will be within the pass band of the filter 23. The filter 24 comprises a high-pass filter which passes all frequencies above the steady state or background signal. The signal from the high-pass filter represents the ripple current signal of the capacitor whose frequency is related to the fluid flow in the conduit. The steady state signal is supplied to a multiply and divide circuit 30 which solves the Clausius-Massotti equation set forth above. Circuits well known to those in the art based on operational amplifiers can be used for the multiply and divide circuit. The ripple signal from the high-pass filter is supplied to a phase lock circuit 25 to stabilize its frequency. The signal from the phase lock circuit is then supplied to a multiply circuit 31 which solves the equation set forth above for determining the flow velocity of a vortex shedding meter. Of course, to solve the equation, it will be necessary to determine the constant from prior calibration of the vortex meter.

The signal representing the density from the multiply and divide circuit 30 and the signal representing the flow velocity from the multiply circuit 31 are supplied to a second multiply circuit 32 where they are multiplied to provide an output signal 33 related to the mass flow of fluid. It may be necessary to adjust the actual amplitudes of the density and velocity of the flow signals by a suitable constant to provide an accurate mass flow signal.

In place of analog circuits, one can use digital circuits to solve the equations. The steady state signal and ripple voltage can be converted to digital signals and used to compute the mass flow.

Figure 3:
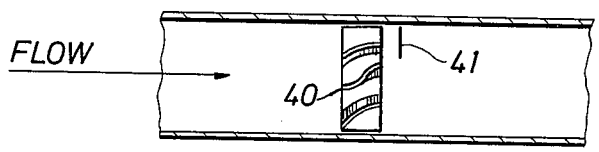
FIG. 3 shows an embodiment of the invention using a turbine type flow meter.

Referring to FIG. 3, there is shown a third embodiment of the invention in which a single cylindrical member 41 forms one plate of the capacitor while the blades on the turbine meter 40 form the second plate. Thus, as the fluid flow rotates the turbine, the blades passing the plate 41 will produce a ripple or alternating signal which will be related to the velocity of flow. Similarly, the capacitor comprising the turbine blades and the cylindrical body 41 will produce a steady state signal which is responsive to the dielectric constant of the fluid flowing in the conduit. The signal from the capacitor of the system in FIG. 3 can be utilized in the same manner as described above with relation to FIG. 2 to produce a mass flow signal.

I claim as my invention:

1. A method for determining the mass flow of a fluid comprising:
   producing a single measurement, including the change in capacitance resulting from the turbulence in fluid flow produced by a bluff body extending into the flow path and the background capacitance of the fluid;
   filtering said single measurement a first time to provide a steady-state dielectric constant measurement;
   filtering said single measurement a second time to remove the steady-state dielectric constant signal to provide an alternating signal related to the turbulence; and
   multiplying the turbulence and dielectric constant measurements to compute the mass flow of the fluid.

2. An apparatus for measuring the mass flow of a fluid through a conduit comprising:
   an elongated bluff body, said bluff body extending into said conduit with the major axis of the bluff body at an angle to the axis of the conduit;
   a capacitor means, said capacitor means being disposed to measure both the turbulent flow produced by said bluff body and the dielectric constant of said fluid;
   first filter means, said capacitor being coupled to said first filter means to remove all signals from said capacitor signal except the steady-state signal;
   second filter means, said capacitor being coupled to said second filter means to remove the steady-state signal from said capacitor signal; and
   multiplying means, said first and second filter means being coupled to said multiplying means whereby said multiplying means can compute the mass flow of fluid.

3. The apparatus of claim 2 wherein said multiplying means utilizes said first filter signal to produce a signal related to the density of the fluid, and utilizes said second filter signal to produce a signal related to the fluid flow, said signals related to density and fluid flow being multiplied to provide a signal related to the mass flow of fluid.

4. The apparatus of claim 2 wherein said capacitor means comprises two capacitor plates disposed to detect the oscillation of the vortex stream produced in the fluid flow by said bluff body.

5. The apparatus of claim 2 wherein said capacitor means comprises said bluff body and a capacitor plate spaced from said bluff body.

* * * * *